C. CARPENTER.
Improvement in the Manufacture of Iron Door-Knobs.
No. 129,458.  Patented July 16, 1872.
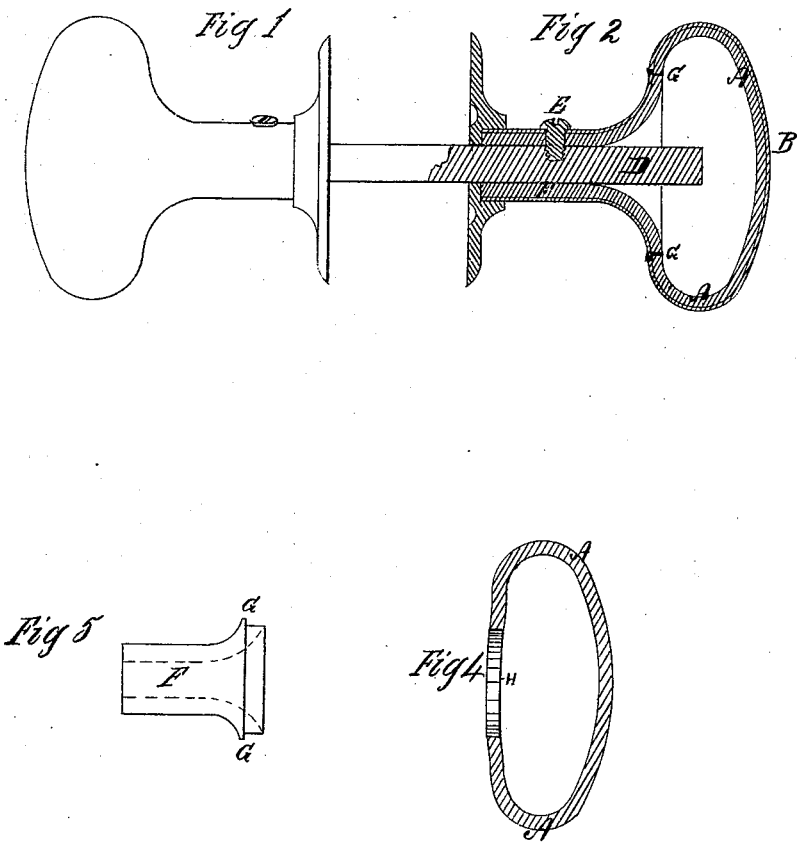
Witnesses.
W Bruce.
Jno. A. Atkinson.
Inventor.
Charles Carpenter.

No. 129,458

UNITED STATES PATENT OFFICE.

CHARLES CARPENTER, OF HAMILTON, CANADA.

IMPROVEMENT IN THE MANUFACTURE OF IRON DOOR-KNOBS.

Specification forming part of Letters Patent No. 129,458, dated July 16, 1872.

Specification describing a certain Improvement in the Manufacture of Iron Door-Knobs, invented by CHARLES CARPENTER, of the city of Hamilton, in the county of Wentworth, in the Province of Ontario, Canada.

The object of the invention is to provide a cheap, durable, and highly-finished door-knob with the shank and knob of separate pieces, but, by the improved art or process of manufacture, are so firmly united together that they cannot come apart.

Figures 1 and 2 represent the knob, shank scutcheon, spindle, and fastening-screw. Fig. 3 represents the shank separate, and Fig. 4 the hollow bowl.

By reference to the annexed drawing it will be seen that the bowl of the knob, Fig. 4, is cast hollow, as shown, and the spindle-holder or shank, Fig. 3, is cast as shown. They are effectually united together as follows: The opening H in the bowl, Fig. 4, is made round or circular with a suitable instrument. The spindle-holder F, Fig. 3, is turned in a lathe, and left so large that it will not enter the opening H, Fig. 4, when cold. The bowl is then heated to a red heat, which causes the said opening H to expand and become large enough to admit the spindle-holder F. When the bowl becomes cold it shrinks firmly on it, making the knob as strong as if it were cast in one entire piece. A A, the bowl; F, the spindle-holder, the two pieces joined, as above described, at the points G G. The outside line B, Fig. 2, represents the tinning or plating of the knob after the parts are put together. There is a small rim on the spindle-holder to prevent it from entering too far into the bowl.

When the knob is completed it appears, as shown at Fig. 1, a model of beauty and strength.

By my device this difficulty is overcome, as the bowl and spindle-holder will not come apart when properly united.

What I claim as my invention consists—

In casting the knob A and spindle-holder F in separate pieces, as shown, of gray iron or malleable cast, and uniting them substantially as herein specified.

Hamilton, January 31, 1872.

CHARLES CARPENTER.

Witnesses:
W. BRUCE,
JNO. A. ATKINSON.